Aug. 30, 1938.   W. P. HUNT ET AL   2,128,706
HONING MACHINE
Filed Oct. 25, 1937   3 Sheets-Sheet 1

Inventors
Wilson P. Hunt and
Daniel C. Eipper,
By Walter N. Haskell,
Their Attorney

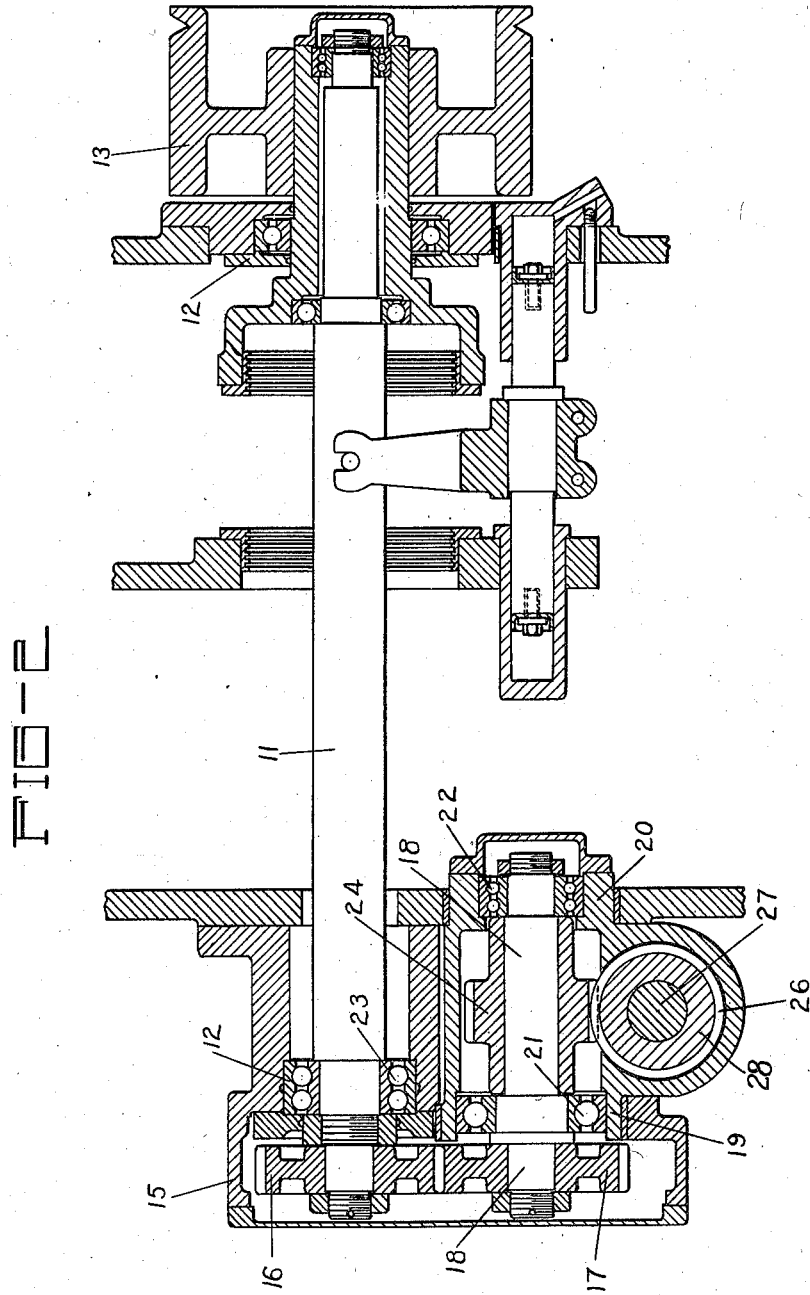

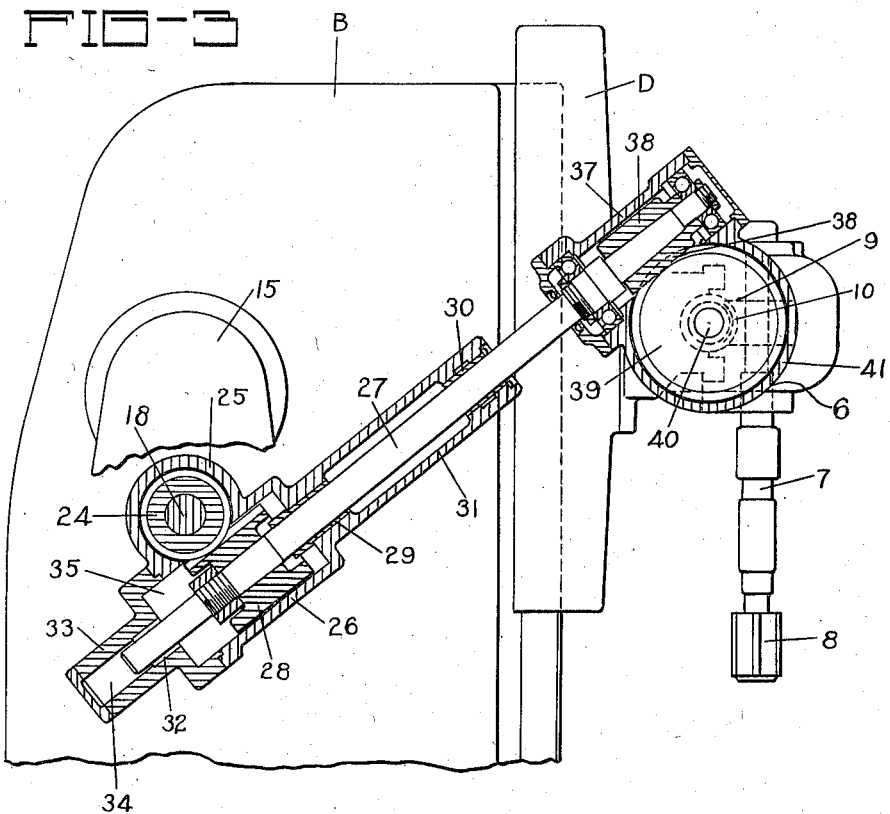

Patented Aug. 30, 1938

2,128,706

UNITED STATES PATENT OFFICE 2,128,706

HONING MACHINE

Wilson P. Hunt and Daniel C. Eipper, Moline, Ill., assignors to Moline Tool Company, Moline, Ill., a corporation Application October 25, 1937, Serial No. 170,821

5 Claims. (Cl. 51—34)

Our invention has reference to a hydraulic honing or lapping machine, and the apparatus can be adapted for use with any machine of that type, including drilling and boring machines, which embody spindles mounted for rotation, and a supporting head by means of which the spindles and tools carried thereby can be given a reciprocating movement to and from a piece of work. It is a common practice to operate a gang of honing tools in unison by means of a spiral or worm drive, driving worm gear wheels on the spindles which support the tools, but on account of the constantly changing position of the head which carries the spindles it is a difficult matter to provide transmission devices between the main drive shaft of the machine and the worm pinion on the head. The chief purpose of the present invention is to provide such means, of a character which will adapt itself readily to any position of the head, in its reciprocating movement.

The machine set forth herein has separate instrumentalities for moving the tools to and from a piece of work, and for giving a rotary movement thereto. The first of these is of a standard type, including hydraulic mechanism and a motor for the operation thereof, which are not involved in the present application, and are not disclosed in the drawing herein. The devices for rotating the spindles include a main drive shaft and motor therefor, and shaft connections between said drive shaft and the worm drive for the spindles of a telescopic character, with mechanism which will compensate for any change in the position of the spindle assemblage during its operation.

The above named and other features and advantages of the invention will more fully appear from the following specification, taken in connection with the accompanying drawings, in which:

Fig. 2 is a sectional view of the main drive mechanism.

Fig. 3 shows the power transmission devices partially in longitudinal section.

Fig. 4 shows a modified form of the invention.

Figure 1:
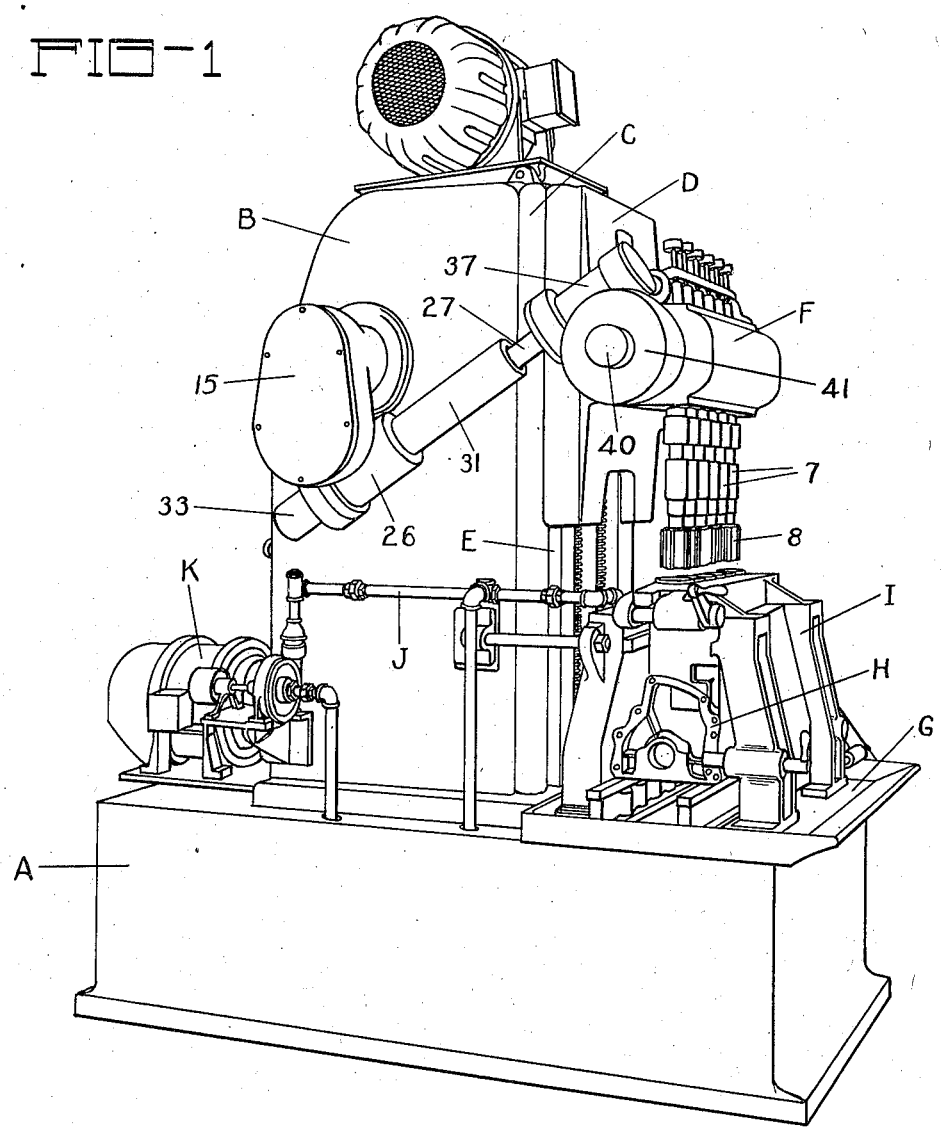
Fig. 1 is a perspective end view of a machine embodying the invention.

In Fig. 1 the reference character A indicates the base of a machine, upon which is mounted a housing B, having a front plate C, upon which a head D is vertically movable by means of guides E. Carried by the head D is a cylindrical housing F, containing mechanism hereinafter described. At the forward part of the base A is supported a table or bed G, upon which is held a piece of work H, by means of supports I and clamping devices carried thereby. In the present case the illustration shows the engine block of an automobile, positioned for the honing of the cylinder walls of the engine. Water is supplied to the work through pipes J, connected with a pump K, mounted on the frame.

Supported in bearings 6 in the lower part of the housing F is a series of spindles 7, provided at their lower ends with lapping or honing tools 8. Each of said spindles is driven by means of a worm gear wheel 9 thereon, actuated by a worm pinion 10 extending longitudinally of the housing F, and common to all of the spindles.

Within the housing B is a power shaft 11, supported in bearings 12, to which shaft a rotary movement is given from suitable power devices, as by means of a multiple sheave 13 on one end of the shaft, and transmission devices connected therewith, but not fully shown herein. At its opposite end the shaft 11 projects beyond the housing B and into a gear-box 15 fixed to the end of the housing, in which gear-box is a gear-wheel 16, fixed on the end of said shaft, and in mesh with a similar wheel 17, on a shaft 18, journaled in bearings 19 and 20 in the box 15 and endplate of the housing B. The bearings are also fitted with ball-bearing units 21 and 22, and the bearings 12 are similarly provided with anti-friction bearings 23. The chief purpose of the use of the two shafts and connecting gear wheels is in case it should be desired to vary the speed of the shaft 18, which can be done by using gears 16 and 17 of varying diameters. Otherwise the power can be applied directly to the shaft 18.

Fixed on the shaft 18 between the bearings 19 and 20 is a worm-gear wheel 24, in a casing 25, from which is supported a housing 26, in which is rotatably mounted a shaft 27. Fixed on the shaft 27 is a worm-gear pinion 28, in mesh with the worm-gear wheel 24. The shaft 27 is supported by bushings 29 and 30 in an extension 31 of the housing 26 and a bushing 32 in a rearward extension 33 of said housing, and containing a space 34 which affords a movement of the shaft 27 in that direction. A corresponding movement of the worm pinion 28 is permitted by a space 35 in the housing 26. The length of the pinion 28 is sufficient to insure the meshing engagement thereof with the worm-gear 24 in all positions of the shaft 27.

At the forward end of the shaft 27 is a casing 37, within which is a worm-gear wheel 38, in mesh with a worm drive wheel 39 on a shaft 40, upon which shaft the gear pinion 10 is also secured. The wheel 39 is contained within a casing 41, forming an extension of the housing F, and in the end of which casing one end of the shaft 40 is supported. Said casing is also connected with the casing 37.

When the shaft 11 is in movement the rotation thereof is imparted to the shaft 18 through the gears 16 and 17, and the movement of the last-named shaft is communicated to the worm-gear 24 and pinion 28, to rotate the shaft 27. This movement is imparted through the worm-gear wheel 38 and drive-wheel 39 to the shaft 40 and pinion, rotating the spindles 7, which movement is constant while the machine is in operation. During this movement the spindles are being reciprocated by the movement of the head D, by means of mechanism of a conventional type, not shown herein. As the head moves downwardly the shaft 27 telescopes within the extension 31, with the rear end of the shaft moving into the space in the extension 33, and the worm pinion 28 automatically adapting itself to the changing position of the shaft. This results in a certain flexibility or yieldability of movement between the stationary housing 26 on the body of the machine and the movable housing F on the head, allowing for any changes in the relative movements thereof. Upon the return movement of the head D the shaft 27 and worm-gear thereon move forwardly again, and resume their former positions, shown in Fig. 3.

In Fig. 4 is shown another form of the invention, in which a gear pinion 42 is held rotatably in the housing 26, between ball bearing outfits 43 and 44, and slidable in the pinion 42 is a shaft 45, caused to rotate with the pinion by means of a spline 46 in a groove (not shown) in the pinion. The operation of the shaft 45 is similar to that of the shaft 27 before described, except that it has a shiftable movement independently of the pinion 42, which it replaces.

Other changes can be made in the general construction and arrangements of the apparatus, without departing from the spirit of the invention, as pointed out herein.

What we claim, and desire to secure by Letters Patent, is:

1. A machine of the class described, comprising a base, a support mounted thereon, a head mounted on said support to reciprocate, a gang of tool spindles carried by said head, and each provided with a gear member, a worm-gear pinion supported in proximity to said spindles, and in engagement with said gear members, a shaft rotatably mounted in parallel relation with said worm-gear pinion, a worm gear wheel on the said shaft, means for rotating said shaft, a shaft mounting, a transmission shaft supported in said mounting for rotation and sliding movement therein, a worm gear pinion on said transmission shaft, and movable therewith, and connections between said transmission shaft and first-named worm-gear pinion to impart the rotation of the shaft thereto.

2. A machine of the class described, comprising a base, a support thereon, a head mounted on said support to reciprocate, a tool spindle rotatably supported on said head, a shaft rotatably mounted in said support, a gear-drive wheel on said shaft, means for rotating said shaft, a shaft mounting supported adjacent to said shaft, a transmission shaft supported in said mounting for rotation and shifting movement longitudinally, a gear-pinion on said transmisson shaft in mesh with said gear-drive wheel, in all movements of the shaft, and gear connections between said transmission shaft and said spindle to impart rotation thereto.

3. A machine of the class described, comprising a frame, a gear drive member mounted therein, means for rotating said drive member, a transmission shaft mounting adjacent to said drive member, a shaft supported in said mounting for rotation and slidable movement therein, a gear pinion on said shaft in mesh with said drive member, and engaging the same in any position of said shaft, a plurality of tool-holding spindles mounted to rotate and reciprocate, and provided with suitable gearing for the rotation thereof, a gear pinion engaging said gearing, movable therewith, and gear connections between said shaft and said last-named gear pinion, to rotate the same.

4. A machine of the class described, comprising a support, a head mounted thereon to reciprocate, a plurality of tool carrying spindles rotatably supported by said head, and provided with worm-gear elements, a worm-gear pinion in mesh with said worm-gear elements, a drive-shaft supported in said first-named support in parallel relation with the gear-pinion, a gear-drive member in proximity to said drive-shaft and operatively connected therewith, a housing supported from the first-named support, a power transmission shaft supported in said housing for rotation and slidable movement therein, a gear pinion on said shaft in engagement with said gear-drive member, and movable with said shaft, and gear connections between said transmission shaft and said first-named gear-pinion to impart the rotary movement of the shaft thereto.

5. A machine of the class described, comprising a frame, a head supported on said frame to reciprocate, a gang of tool spindles mounted on said head, provided with gear members, a gear pinion supported for engagement with said gear members, to impart rotation to the spindles, and a gear drive wheel at one end thereof, a drive shaft supported in said frame in parallel relation with said gear pinion, and fixed in position with reference thereto, a gear member operatively connected with said last named drive shaft, and operatively connected with said gear drive wheel, and capable of being extended and retracted to conform to the varying spacing between said drive-shaft and gear pinion.

WILSON P. HUNT.
DANIEL C. EIPPER.